G. O. HULICK.
SURGICAL APPLIANCE.
APPLICATION FILED NOV. 8, 1917.

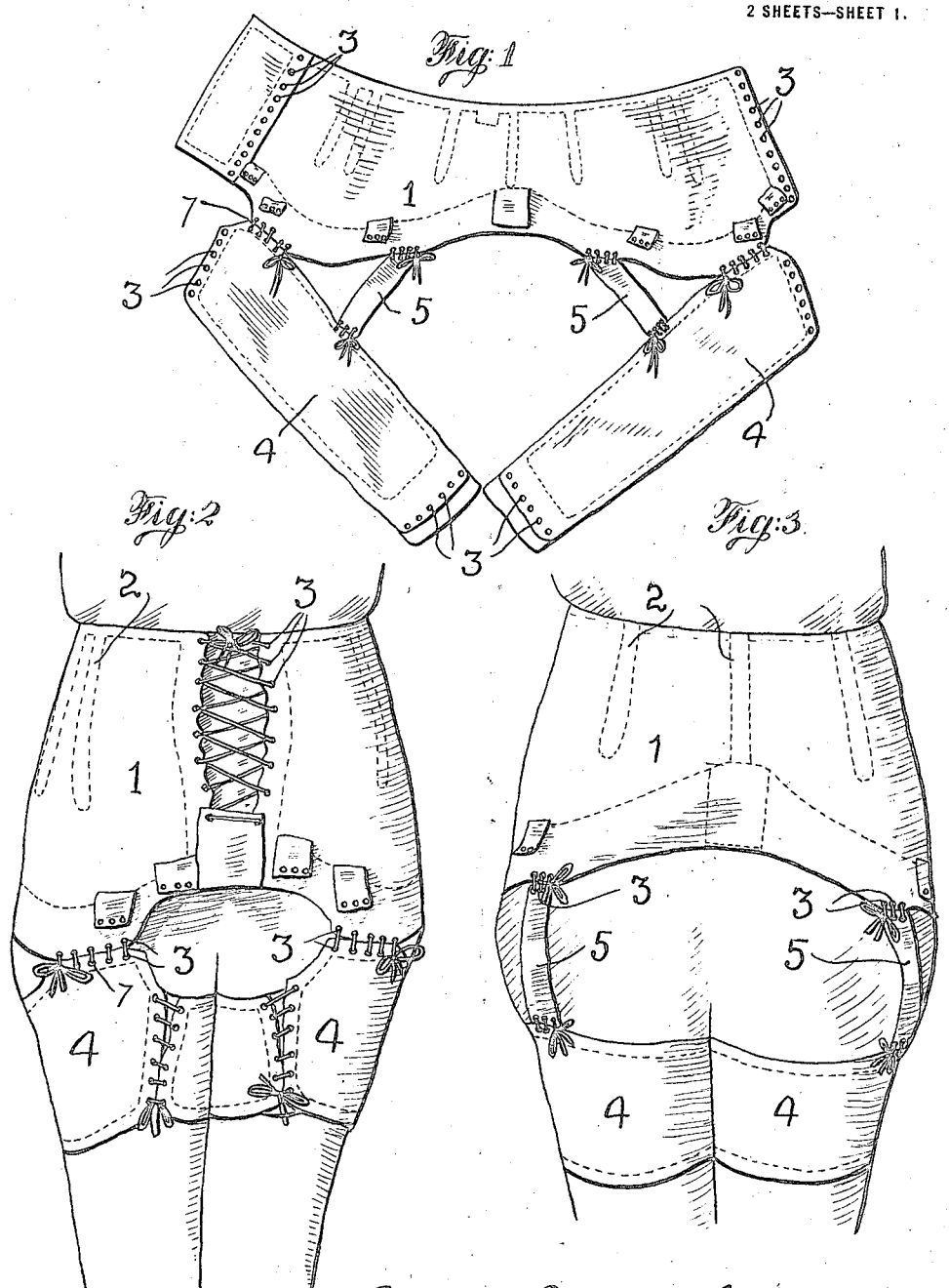

1,426,740.

Patented Aug. 22, 1922.
2 SHEETS—SHEET 2.

UNITED STATES PATENT OFFICE.

GEORGE O. HULICK, OF EAST ST. LOUIS, ILLINOIS.

SURGICAL APPLIANCE.

1,426,740.  Specification of Letters Patent.  Patented Aug. 22, 1922.

Application filed November 8, 1917. Serial No. 200,915.

*To all whom it may concern:*

Be it known that I, GEORGE O. HULICK, a citizen of the United States, and a resident of East St. Louis, county of St. Clair, and State of Illinois, have invented an Improvement in Surgical Appliances, of which the following is a specification.

This invention relates to surgical appliances, and with regard to certain more specific features, to a device useful as an abdominal binder and as a surgical-dressing retainer.

Among the objects of the invention may be noted the provision of a simple and inexpensive surgical appliance opening in front, and adapted for use either with or without leg-pieces and hose-supporters, or both; the provision of a device of the above type that is easily applied and removed, comfortable to the wearer, and reliable in the performance of its required functions; the provision of an abdominal supporter having efficient anchorage at its lower edges, to prevent rolling up and rotation or vertical movement with respect to the body. Other objects will be in part obvious and in part pointed out hereinafter.

The invention accordingly comprises the features of construction and operation, combination of elements and arrangements of parts which are exemplified in the structure hereinafter described and the scope of the application of which will be pointed out in the following claim.

In the accompanying drawings showing one or more embodiments of this invention,

Figure 1 is a view of the appliance when spread out flat.

Figure 2 is a front view of the appliance in use.

Figure 3 is a rear view of the same.

Similar reference characters indicate corresponding parts in all the views.

Figure 4:
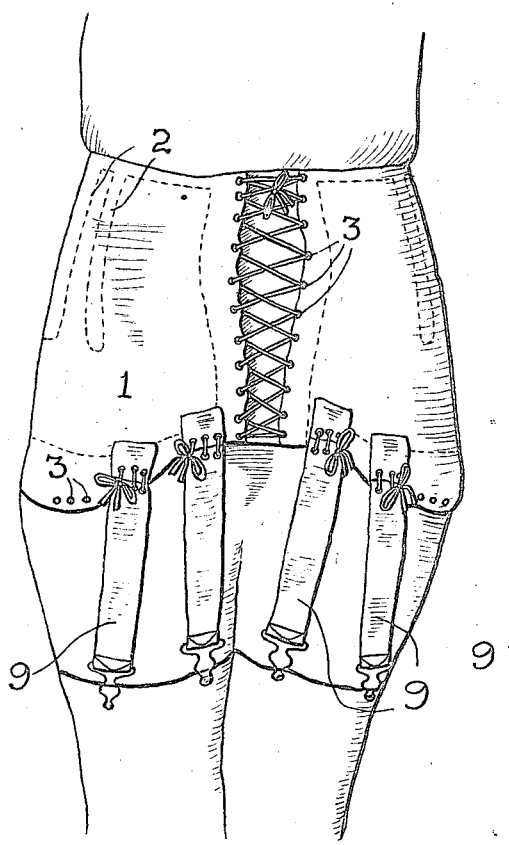
Figure 4 is a front view of the appliance in position, with the leg-pieces removed and the hose-supporters attached.

In considering this invention in its relation to the prior art, it may be noted that appliances serving as abdominal binders or surgical-dressing retainers ordinarily have no efficient anchorage for the lower edge. This lack of efficient anchorage allows the appliance to roll up, due to the motions of the body, thereby decreasing the efficiency of the appliance and annoying the wearer, and it has the further disadvantage that the device, since it is not sufficiently anchored, can rotate on the body. This is objectionable when the device is used as an abdominal binder, although at such time the device is ordinarily applied tightly enough to reduce the tendency to rotation. When the device is used as a surgical-dressing retainer, however, it is ordinarily applied less tightly and there is more danger of it rotating with respect to the body, and furthermore, such rotation is liable to disarrange the dressings, with serious consequences. Again, devices that lace in the back have been found objectionable because of the necessity of raising the patient in applying and removing the device, with the attendant danger of dislocating the dressings when the patient is thus lifted and the appliance being replaced. As the description progresses, it will be seen that with the device of the present invention these and other disadvantages of prior appliances are obviated.

Referring now to the accompanying drawings, and more particularly to Figure 1 thereof, there is illustrated at 1 the main or abdominal portion of the device, which consists preferably of cloth. The exact shape of the device is naturally accommodated to the persons being fitted, but the shape illustrated in Figure 1 will serve for purposes of illustration. Substantially vertical darts 2 are shown, for the purpose of taking up or shortening the upper edge to make the device better conform to the body of the wearer. The edges may be laced together as indicated in Figure 2, and eyelets 3 are provided for that purpose. While lacing is the preferred way of holding the parts together, it is understood that other means for that purpose may be used without departing from the spirit of the invention.

The leg-pieces 4 are made preferably of cloth and may be secured around the limb by lacing or otherwise, as in the case of the main body 1 of the device. The exact shape and size of these leg-pieces will also be determined by the measurements of the wearer. By having the leg-pieces cut separately from the main body, an economy of material can be effected as compared with devices having the leg-pieces integral with the main or body portion. Furthermore, the present construction permits of the use of the main portion 1 without the leg-pieces, when desired, From certain aspects of the invention, the leg-pieces may, however, be made integral with the main body without departing from the spirit of the invention.

The leg-pieces 4 are preferably attached to the main portion 1 by means of one or more elastic webs 5 at the back, thus permitting the wearer to assume a sitting posture; and the leg-pieces are preferably attached in front by lacing, indicated at 7.

Figure 5:
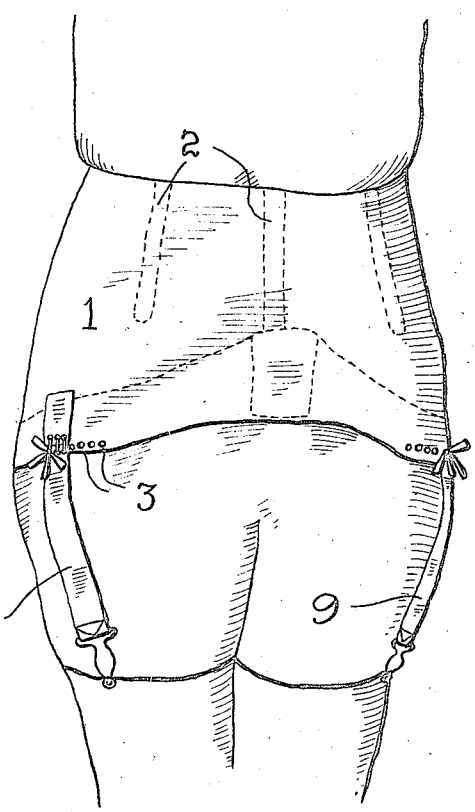
Figure 5 is a rear view of the appliance illustrated in Figure 4.

When desired, hose-supporters 9 may be attached to the main portion of the device, as indicated in Figures 4 and 5, and, for ordinary use, where the exact positioning of the main portion is not of vital importance, the leg-pieces 4 may be dispensed with and their function sufficiently performed by the downward pull of the hose upon the hose-supporters. Again, the hose-supporters may be used in conjunction with the leg-pieces, if desired.

In view of the fact that the lacing of both main portion and leg-portions is in front, the wearer can ordinarily adjust the device without help, particularly if he is using the device as an abdominal binder. When the device is used for holding surgical dressings, particularly as in abdominal and pelvic operations, the device may be slipped under the patient and readily fastened in place without disturbing the position of the patient or the dressings. Likewise, in redressing the wound, the device may be simply unfastened and turned back until the new dressings are in place, when it can be again laced without disturbing the position of the patient.

While for ordinary use no stays are needed in this device, there is occasional use for stays, particularly in devices of extreme height. In such cases, the stays are preferably provided and are made removable to facilitate laundering.

In view of the above, it will be seen that the several objects of this invention are achieved, and other advantageous results attained.

As various possible embodiments might be made of the above invention and as various changes might be made in the embodiments above set forth, it is to be understood that all matter herein set forth or shown in the accompanying drawings is to be interpreted as illustrative and not in a limiting sense.

I claim:

A device of the class described having a main abdominal portion laced in front, leg portions laced thereto in front, and straps at the rear connecting the leg portions with the main portion.

In testimony whereof I have signed my name to this specification this 31st day of October, 1917.

GEORGE O. HULICK,